May 16, 1961  G. A. LYON  2,984,518
WHEEL COVER
Filed Dec. 18, 1956  4 Sheets-Sheet 4
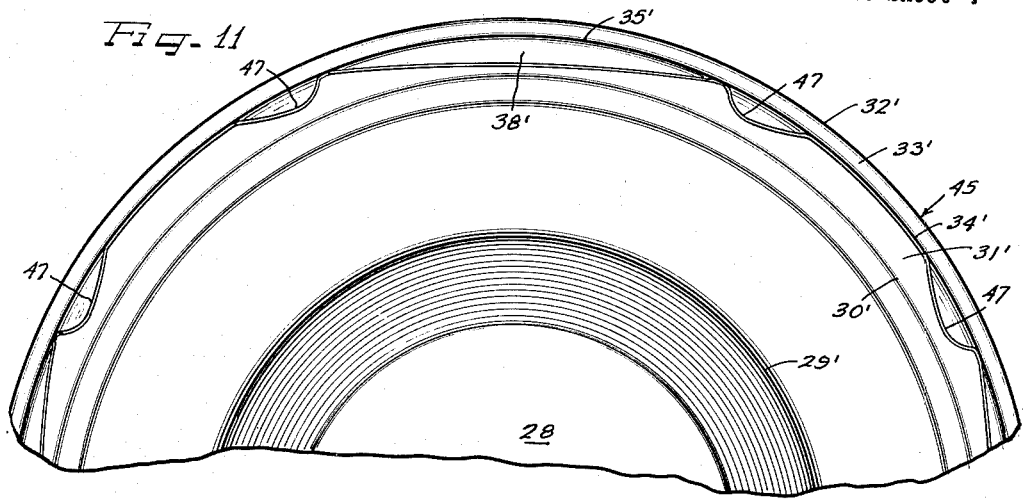
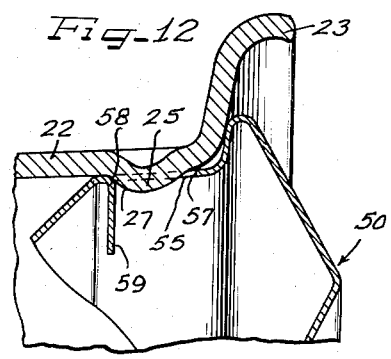
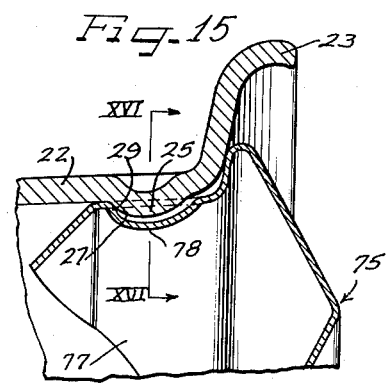
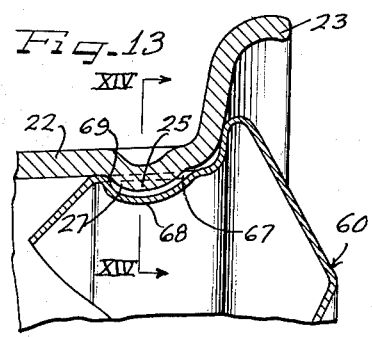
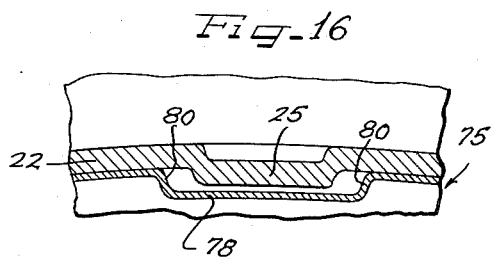
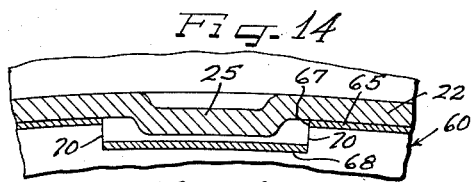
Inventor
GEORGE ALBERT LYON
by Hill, Sherman, Meroni, Gross & Simpson Attys.

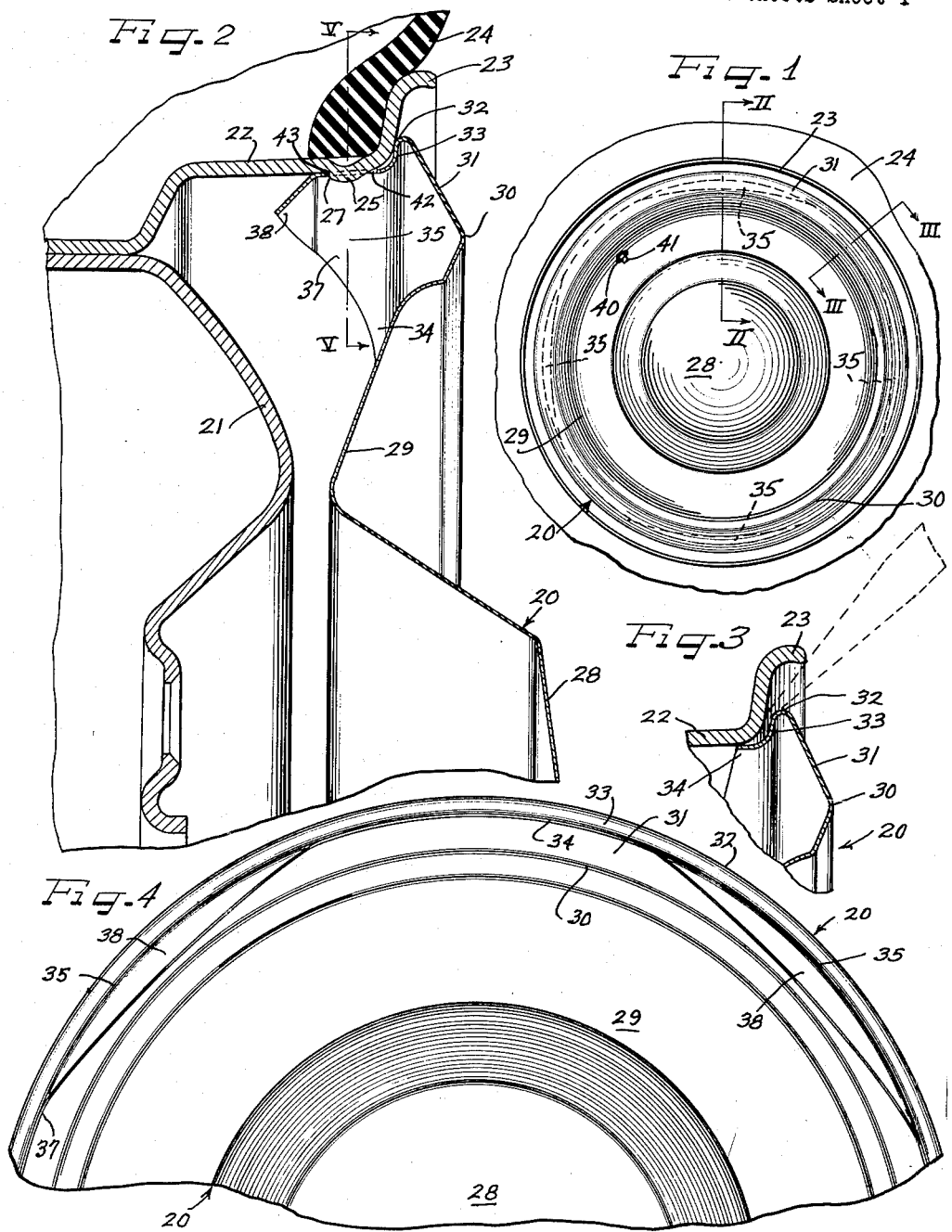

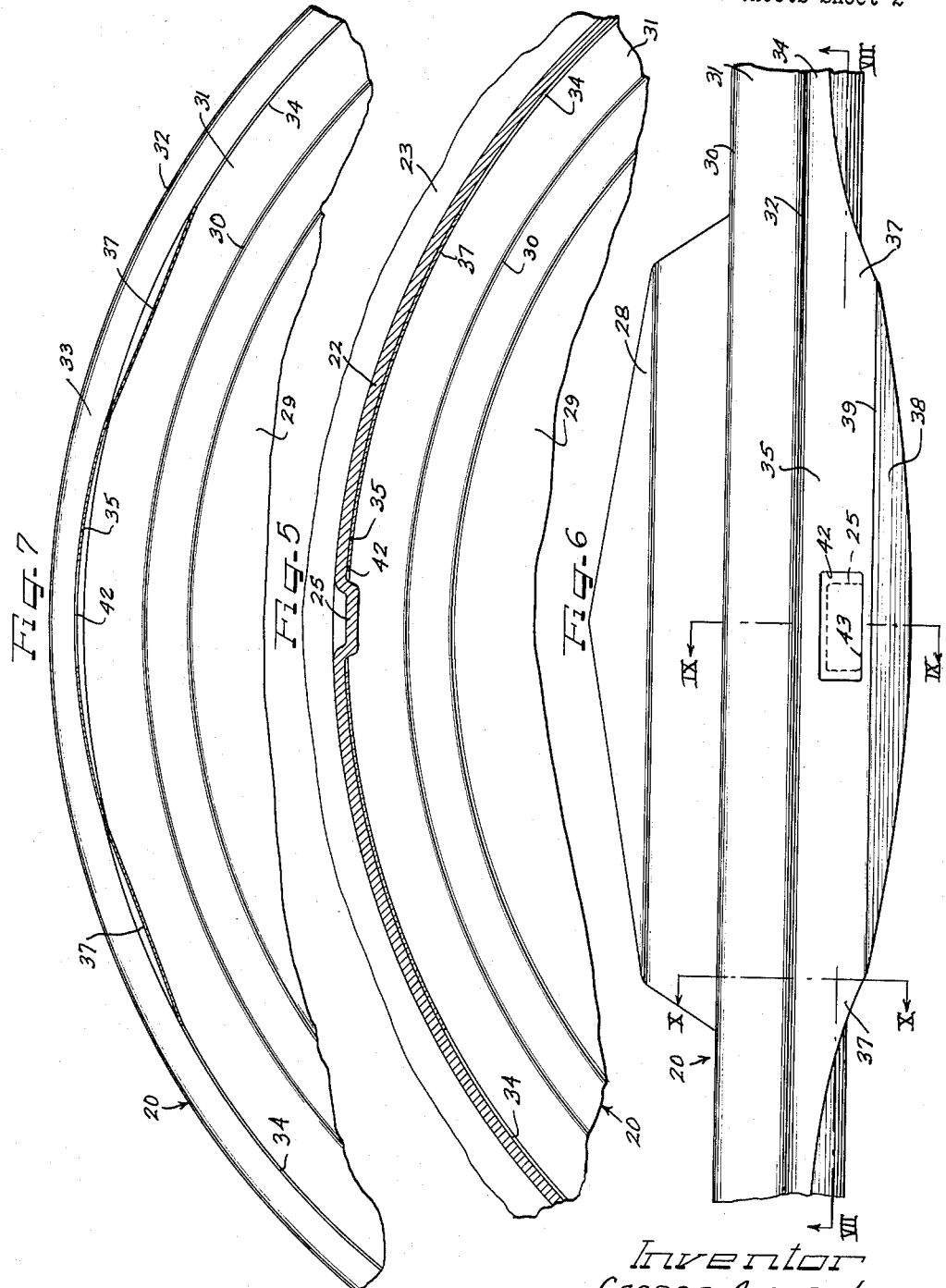

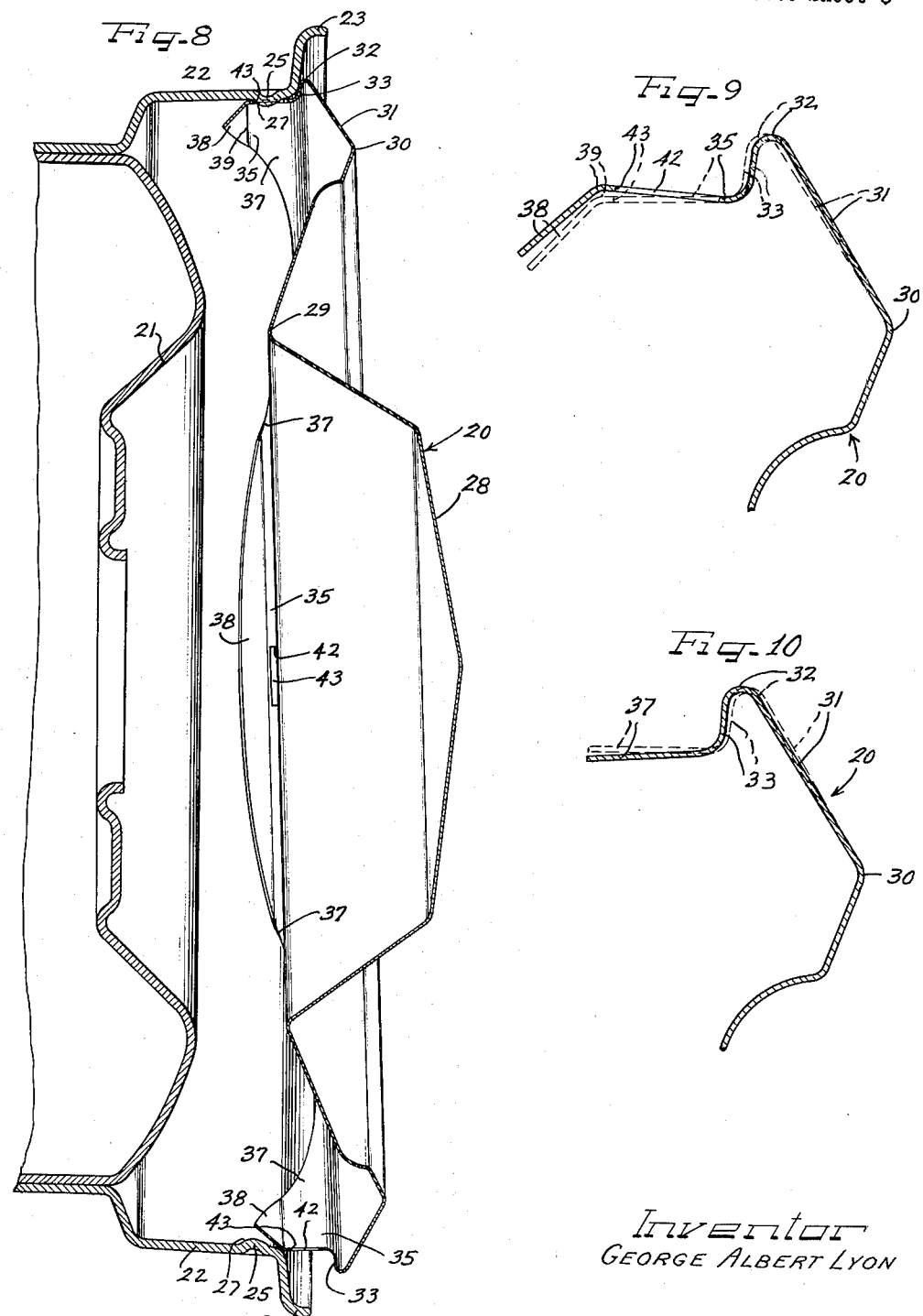

United States Patent Office 2,984,518
Patented May 16, 1961

2,984,518
WHEEL COVER
George Albert Lyon, 13881 W. Chicago Blvd., Detroit 28, Mich.
Filed Dec. 18, 1956, Ser. No. 629,039
11 Claims. (Cl. 301—37)

The present invention relates to improvements in wheel structures and more particularly concerns the ornamental and protective covering of the outer sides of vehicle wheels.

Due to the variables and manufacturing tolerances experienced with respect to sheet metal members, and in the present instance more particularly tire rims and wheel covers made from sheet metal, the tire rims being rolled from rather heavy gauge material and the wheel covers stamped and drawn from thin gauge material, a substantial problem is encountered in maintaining a snug, stable, non-rattling, effective engagement of wheel cover retaining means with a tire rim that is provided with retaining bumps thereon. It has been proposed, of course, to provide covers that have a continuous beaded circular flange that will snap behind and grip the retaining bumps. In the first place, such a flange requires a large amount of material and with the cost of material such as stainless steel constantly increasing, there is a corresponding need to increase wheel cover costs where such a continuous flange is used. Secondly, due to the variables existing in sheet metal structures, it is difficult to maintain a proper relationship dimensionally between the cover retaining beaded flange and the rim flange that has the retaining bumps, so that certain covers go on too tight and others are too loose in any production run of such covers. This is of course objectionable since it either results in rejects or in unsatisfactory covers insofar as the user is concerned.

An important object of the present invention is to provide a self-retaining wheel cover of sheet metal having improved means for retaining interengagement with retaining bumps and a rim flange on which the bumps are provided.

Another object of the invention is to provide improved self-equalizing, uniformly flexibly engageable cover retaining finger means especially adapted for coacting with a tire rim flange provided with cover retaining bumps.

A further object of the invention is to provide improved cover structure for disposition at the outer side of a wheel having cover retaining bumps on a rim flange and which retaining means substantially facilitates application of the cover to the outer side of the wheel.

Still another object of the invention is to provide a wheel cover structure having self-retaining flange means thereon that can be produced at low cost.

Still another object of the invention is to provide improved cover retaining means engageable with a rim flange in effective cushioned, stabilizing relation.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention;

Figure 2 is a fragmentary radial enlarged sectional detail view taken substantially on the line II—II of Figure 1;

Figure 3 is a fragmentary enlarged radial sectional detail view taken substantially on the line III—III of Figure 1;

Figure 4 is a fragmentary rear elevational view of the cover of Figure 2;

Figure 5 is a fragmentary sectional detail view taken substantially on the line V—V of Figure 2;

Figure 6 is a fragmentary edge elevational view of the cover;

Figure 7 is a fragmentary sectional elevational view taken substantially on the line VII—VII of Figure 6;

Figure 8 is a diametrical sectional view taken substantially in the same plane as Figure 2 but showing the cover in process of being applied to the outer side of the wheel;

Figure 9 is an enlarged fragmentary sectional detail view through the marginal portion of the cover taken substantially on the line IX—IX of Figure 6;

Figure 10 is an enlarged fragmentary sectional detail view through the cover margin taken substantially on the line X—X of Figure 6;

Figure 11 is a fragmentary inner or rear elevational view of a slight modification of the cover;

Figure 12 is a radial sectional detail view through a further modification of the cover;

Figure 13 is a similar radial sectional detail view through still another modification;

Figure 14 is a fragmentary sectional detail view taken substantially on the line XIV—XIV of Figure 13;

Figure 15 is a fragmentary sectional detail view similar to Figures 12 and 13 but showing yet another slight modification; and Figure 16 is a fragmentary sectional detail view taken substantially on the line XVI—XVI of Figure 15.

A wheel cover 20 embodying features of the invention is adapted to be applied to the outer side of a vehicle wheel including a wheel body 21 which supports a tire rim of the drop-center, multi-flange type including an intermediate generally radially inwardly facing and axially outwardly inclined flange 22 merging into a terminal flange 23 that extends radially outwardly and then is turned axially outwardly. A pneumatic tire 24 is adapted to be supported by the tire rim.

In the axially outer part thereof, adjacent to juncture with the terminal flange 23, the intermediate flange 22 has a series of circumferentially spaced generally radially inwardly extending protrusions or retaining bumps 25. By preference there are four of such retaining bumps equidistantly spaced about the rim flange 22 and each provided with a generally radially and axially inwardly facing retaining shoulder 27. There may, of course, be more or less of the retaining bumps 25.

In a preferred form, the cover 20 comprises a one-piece sheet metal full disk member, that is, it is of dimension to substantially entirely overlie the wheel inclusive of the wheel body 21 and the tire rim. If preferred, the cover could be a ring member with a central separable member or hub cap. However, the construction and arrangement of the cover 20 is such that it is readily applicable in its entirety to the wheel by pressing the same into position manually and is removable readily by simply prying the same free from the wheel as by means of a screwdriver or the like type of pry-off tool. The cover 20 may be made from suitable material such as stainless steel, brass or the like.

Centrally the cover 20 has a crown portion 28 about which is a circular inwardly dished intermediate portion 29 leading to a radially outer marginal annular portion 30 which in the present instance is axially outwardly ribbed and has a generally radially outwardly and axially inwardly oblique annular marginal extremity portion 31 of some resilient flexibility, but stiffened as to its flexibility by the ribbed annular portion 30 and by a turned extremity reinforcing and finishing small radius rib-like terminal 32.

The turned extremity 32 is of a diameter to overlie the terminal flange 23 of the tire rim adjacent juncture thereof with the intermediate flange 22 and sufficiently radially inwardly from the outturned portion of the terminal flange to accommodate wheel balancing weights.

For retaining the cover 20 on the wheel, improved cover retaining finger means formed integrally in one piece therewith are provided. To this end, an underturned narrow generally radially inwardly extending flange 33 projects from the axially inner side of the turned extremity 32 and has extending generally axially inwardly therefrom a continuous annular portion 34 which is adapted to clear around the juncture between the intermediate and terminal flanges.

Projecting generally axially inwardly as extensions in one piece from the flange portion 34 is a series of cover retaining fingers 35. Each of the fingers 35 is of a length to extend axially inwardly a short distance beyond the retaining shoulders 27 of the retaining bumps 25 and there are as many of the retaining fingers as there are retaining bumps, in this instance for equally spaced about the margin of the cover and concealed behind the cover margin.

Each of the retaining fingers 35 is normally angled axially inwardly and inclined radially outwardly as shown in full outline in Figure 9 so that the radially outermost inner end portion of the finger extends to a slightly greater diameter than the diameter of the intermediate flange 22 about the base portions of the retaining bumps 25. On the other hand, the side portions of the retaining fingers 35 which are of substantial arcuate width generally following the circumference of the cover, and tapering widely toward juncture with the flange portion 34, are preferably at least slightly indented as shown at 37 in Figure 7. At their inner extremities, the retaining fingers 35 are provided with inturned generally radially and axially inwardly inclined respective terminal flange portions 38 which join the main body portions of the fingers 35 on reinforcing bend junctures 39 which substantially reinforce and resiliently stiffen the arched wide fingers. It will be noted that the angular terminal portions 38 extending on substantially a chord between the opposite sides of the respective fingers and terminate adjacent the respective radially inwardly indented side portions 37 of the fingers.

In applying the cover 20 to the outer side of a vehicle wheel, a valve stem aperture 40 located in the intermediate cover portion 29 centrally between two of the retaining fingers 35, substantially as shown in Figure 1, is registered with a valve stem 41 which is located centrally on the tire rim between two of the retaining bumps 25. In doing so, the cover is canted relative to the face plane of the wheel toward the valve stem 41. This maneuver not only registers the valve stem through the valve stem aperture 40 but at the same time brings the two adjacent retaining fingers 35 into position in registration or alignment with the adjacent two retaining bumps 25. The manner in which alignment of the retaining fingers 35 with the retaining bumps 25 is effected in such initial phase of application of the cover to the wheel is depicted in Figure 8.

As will be seen in the upper portion of Figure 8, where one of the two first-engaged retaining fingers 35 is shown, a bump-receiving socket opening 42 is registered with the retaining bumps 25 and with a bump-engaging shoulder 43 defining the axially inner edge of the opening engaging behind the bump shoulder 27. Since the underturned marginal seating and stop flange 33 engages against the terminal flange 23, the retaining shoulder 43 of the finger is maintained in a snug gripping relation to the base portion of the retaining shoulder 27. As will be observed especially in Figures 5 and 6, some clearance is afforded between the axially outer edge defining the socket aperture 42 and the axially outer cam surface of the retaining bump 25 as well as between the opposing circumferentially spaced side edges defining the aperture and the opposing sides of the retaining bump. This not only avoids interference with proper thrusting retaining, latching engagement of the socket shoulder 43 with the bump shoulder 27, by virtue of the clearance at the axially outer portion of the socket aperture, but also affords a limited, desirable tolerance in a circumferential sense in effecting registration of the socket apertures with the retaining bumps. Nevertheless, the circumferential sides of the socket apertures closely enough oppose the respective sides of the retaining bumps to restrain the cover against turning on the wheel in service so as to avoid distortion of the valve stem 41 or even movement out of alignment therewith of the valve stem aperture 40.

During the initial phase of application of the cover to the wheel, still referring to Figure 8, the generally axially outwardly inclined normal bias of the retaining fingers 35 facilitates finding and registration of the retaining bumps 25 with the retaining socket apertures 42, and with the finger shoulder 43 cammingly engaging behind the bump shoulder 27, and the reinforcing shoulder rib-like juncture 39 axially inwardly adjacent to the shoulder 43 opposing the intermediate flange 22 adjacent the base of the bump shoulder 27. It will be observed that since the finger shoulder 43 is quite close to the reinforcing rib juncture 39 axially inwardly adjacent thereto, substantial reinforcement for the finger shoulder 43 is provided.

To complete application of the cover to the outer side of the wheel, the outwardly canted portion of the cover as depicted in the lower portion of Figure 8, is pressed generally axially inwardly about the fulcrum provided by the initially contacting portion of the seating flange 33. As an incident to this, the terminal portions 38 of the retaining fingers 35 at the outwardly canted portion of the cover assist in locating the cover by engagement with the shoulder at juncture of the intermediate and terminal flanges of the tire rim. As the cover is pressed home, the retaining fingers 35 at the outwardly canted portion of the cover spring resiliently flexibly radially inwardly as the fingers are cammed axially inwardly along the intermediate flange 22 and over the retaining bumps 25 with which such fingers are aligned, and until the retaining bumps are received latchingly within the respective latching socket openings 42, and the respective finger shoulders 43 engage behind the retaining shoulders 27 of the retaining bumps. While such camming, flexing bump engaging action of the remaining two fingers is taking place, the initially rim engaging two fingers are flexed resiliently radially inwardly generally conformably to the intermediate flange 22, that is to the diameter of the engaged portion of the intermediate flange. The flexing action that takes place is depicted more or less schematically in Figure 9, wherein the full outline position of the elements of the retaining fingers and adjacent marginal portions of the cover shows the normal, unflexed condition, while the dot-dash position shows the condition as it appertains when the cover has been fully assembled with the tire rim. It will be observed that as the retaining fingers are flexed radially inwardly, the adjacent portion of the underturned seating flange 33 as well as the finishing extremity 32 and the marginal flange portion 31 are flexed with a substantially rolling action generally axially inwardly relative to the marginal stiffening rib 30. This is a highly desirable action since it affords an advantageous resilient thrusting gripping of the retaining fingers 35 against the intermediate flange 22 by virtue of the resilient tensioned reaction that is created.

At the same time that the retaining fingers 35 are flexed generally radially inwardly and flattened from the normal smaller circumferential radius thereof toward the engaged rim flange radius, the side portions 37 reactively flex generally radially outwardly as depicted in Figure 10 from the full outline position to the dash outline position, with a corresponding generally axially outwardly rolling flexing reaction in the adjacent portions of the underturned flange 33, the extremity rib 32 and the marginal flange portion 31, and with the latter flexing being more pronounced toward the portions of the cover margin intermediate the retaining fingers 35. In other words, the edge of the cover at the extremity 32 assumes a more or less undulated, slightly serpentine uniform wavy axial condition. The result of this when the cover is fully in position on the wheel with all of the retaining fingers in full engagement with the intermediate flange 22 and the latching retaining bumps 25, is depicted in Figures 2 and 3. In Figure 2 it will be observed that in line with the retaining fingers 35, the underturned seating flange 33 seats against the terminal flange 23 of the tire rim. On the other hand, those portions of the seating flange 33 intermediate the retaining fingers are sprung or deflected resiliently slightly axially outwardly so as to be in spaced relation to the rim flange. This is advantageous for facilitating insertion of a pry-off tool behind the cover edge 32 into the gap between the underturned flange 33 and the tire rim as shown in Figure 3.

By virtue of the controlled flexing of the retaining flange structure and the cover margin, the axial flange portion 34 as well as the retaining fingers 35 and the side portions of the fingers 37 effect substantially uniform contact with the intermediate flange 22, as shown in Figure 5. However, should any one or more of the retaining fingers 35 not make full contact with the intermediate flange 22 of the tire rim in the vicinity of the retaining bump 25 due to engagement with the retaining bump shoulder 27, nevertheless the side portions 37 of the retaining fingers will engage with the intermediate flange and as a matter of fact be even more firmly resiliently tensioned into engagement with the intermediate flange. Accordingly, a firm, stable, cushioned, highly road shock resistant and compensated interengagement of the cover flange structure with the tire rim is attained.

In the modification of Figure 11, a cover 45 is shown which in most respects is the same as the cover 20, both as to construction and the cooperation of the cover with the wheel. Similar portions of the cover 45 are identified by the same but primed reference numerals as in the cover 20. However, the cover 45 is of a construction that is especially adapted for material that may not have as high an inherent resiliency factor as other materials suitable for this type of cover. Therefore, in the cover 45, the side portions of the retaining fingers 35' are substantially generally radially inwardly indented as shown at 47 in a more or less serpentine relationship to the fingers 35' and the intermediate portions of the axially extending flange 34'. The indented generally angularly related portions of the fingers 47 afford substantial axial rib-like reinforcement and afford stiffening strut-like means for enhancing the resilient stiffness of the retaining fingers and also the contiguous portions of the cover margin, thus compensating for any lack of inherent resiliency in the sheet metal that may be used for the cover.

In the modification of Figure 12, the cover and the wheel rim are the same as in Figures 2 and 11, but the cover 50 has retaining fingers 55 the same as the retaining fingers 35 and provided with bump latch receiving aperture sockets 57 having projecting inwardly from bump engaging shoulders 58, respective flange portions 59 struck from the openings 57 and affording a finished shoulder without any possible roughness or burr that might unduly resist pry-off of the cover.

The modification of Figures 13 and 14 provides a cover 60 which is the same as the covers 20, 45 or 50 except that in retaining fingers 65 bump receiving socket apertures 67 have the axially inner and outer sides thereof connected together by a radially inwardly pressed strip 68 which is pressed inwardly far enough to clear the retaining bump 25 and affords at the axially inner side of the aperture 67 a smooth shoulder 69 engageable with the shoulder 27 of the retaining bump. It will be observed that since the strip 68 is slit as at 70 at each side to sever the same from the material of the retaining finger 65, edges are provided at the circumferentially opposite sides of the aperture 67 for opposing the sides of the retaining bump to hold the cover against turning.

In the form of the invention shown in Figures 15 and 16, a cover 75 is shown that in essential respects is the same as the covers hereinbefore described including the cover 20 and the cover 45, but with the retaining fingers thereof identified at 77 provided with pressed in or embossed retaining bump receiving sockets 78. The sockets 78 in the retaining fingers are of a depth which clears the retaining bumps 25 and at the axially inner side of the socket 78 in each instance is a latching shoulder 79 which is engageable with the bump shoulder 27. At the circumferentially opposite sides of the socket 78 are provided opposing turn-preventing shoulders 80 which are engageable with the sides of the retaining bump 25 for holding the cover against turning on the wheel.

It will be appreciated, of course, that the structures of any of the modifications may be utilized in the cover 20, as preferred.

It will be understood that modifications and variations may be effected without departing from the scope of the novel concepts of the present invention.

I claim as my invention:

1. In a wheel structure including a tire rim having a generally radially inwardly facing angular flange having a substantially straight axially extending surface, a circular wheel cover for disposition at the outer side of the wheel having a plurality of circumferentially spaced and generally axially inwardly extending retaining fingers of substantial width and arcuately generally conformed to said surface of the annular rim flange and engageable in substantially direct face-to-face relation therewith, said fingers having axially inner portions thereof normally angled to a slightly larger diameter than the portion of the rim flange surface to be engaged thereby, with side portions on said fingers normally disposed in radially inset relation to the radially outward projection of said axially inner portions of the fingers, and in the engagement of said axially inner portions of the fingers and radially inward resilient deflection thereof to the diameter of the engaged portion of the surface of the rim flange and substantially face-to-face abutment of the fingers with said rim flange surface, said inset side portions of the fingers reacting under tension to resist said radially inward deflection and enhancing the resilient thrust of the faces of the fingers radially outwardly against said rim flange surface.

2. In a wheel structure including a tire rim having a generally radially inwardly facing annular flange, a circular wheel cover for disposition at the outer side of the wheel having a plurality of circumferentially spaced and generally axially inwardly extending retaining fingers of substantial width and arcuately generally conformed to said annular rim flange, said fingers having axially inner portions thereof normally angled to a slightly larger diameter than the portion of the rim flange to be engaged thereby, with side portions on said fingers normally disposed in radially inset relation to the radially outward projection of said axially inner portions of the fingers, and in the engagement of said axially inner portions of the fingers and radially inward resilient deflection thereof to the diameter of the engaged portion of the rim flange, said inset side portions of the fingers reacting under tension to resist said radially inward deflection and enhancing the resilient thrust of the fingers radially outwardly against said rim flange, said side portions of the fingers in response to said resilient tension thrusting radially outwardly into engagement against the rim flange to enhance the retaining engagement of the fingers against the rim flange.

3. In a wheel structure including a tire rim having an annular generally radially inwardly facing flange, a cover for disposition at the outer side of the wheel including a plurality of circumferentially spaced generally axially inwardly extending retaining fingers having the axially inner portions thereof normally extending to a larger diameter than the engaged portion of the tire rim and being resiliently radially inwardly deflectable to the diameter of the rim flange in engagement therewith, and portions at the respectively opposite circumferential sides of the fingers connected to the cover and said axially inner finger portions and normally being disposed on a small diameter than the rim flange diameter, said side portions being resiliently deflected radially outwardly into pressing engagement with the rim flange by the action of the fingers being radially inwardly deflected as aforesaid.

4. In a cover for disposition at the outer side of a wheel, including a circular sheet metal cover having a generally axially extending circular marginal flange with generally axially extending cover retaining extensions providing fingers of substantial width projecting therefrom and of a circumferentially transverse radius of curvature substantially throughout their width less than the general radius of curvature of the flange and with the sides of the fingers tapering into said flange between the fingers so that flexure of said fingers toward said flange radius of curvature reacts through said sides into said flange.

5. In a wheel structure including a tire rim having a terminal flange and immediately adjacent thereto an intermediate flange provided with cover-retaining bumps at juncture of said terminal and said intermediate flange including generally axially inwardly facing shoulders and circumferentially facing sides, a cover for disposition at the outer side of the wheel having an underturned outer marginal portion for seating on the terminal flange and provided with a generally radially and axially inwardly extending flange structure to extend around said juncture and provided with generally axially inwardly extending cover retaining fingers of substantial width provided with bump receiving sockets therein clear of the retaining bumps except for bump engaging shoulders at the axially inner sides of the sockets retainingly engageable with the bump shoulders, said sockets being defined at their circumferentially opposite sides with shoulders adapted for opposing the side shoulders of the retaining bumps in limited spaced relation to enable limited circumferential tolerance for reception of the bumps in the sockets but engageable under torque stresses with the sides of the bumps to hold the cover against turning so as to avoid misalignment relative to or distortion of a valve stem projecting through a valve stem aperture in the cover, said socket shoulders being defined by inturned finishing flanges derived from material displaced from the sockets.

6. In a wheel structure including a tire rim having a terminal flange and immediately adjacent thereto an intermediate flange provided with cover-retaining bumps at juncture of said terminal and said intermediate flange including generally axially inwardly facing shoulders and circumferentially facing sides, a cover for disposition at the outer side of the wheel having an underturned outer marginal portion for seating on the terminal flange and provided with a generally radially and axially inwardly extending flange structure to extend around said juncture and provided with generally axially inwardly extending cover retaining fingers of substantial width provided with bump receiving sockets therein clear of the retaining bumps except for bump engaging shoulders at the axially inner sides of the sockets retainingly engageable with the bump shoulders, said sockets being defined at their circumferentially opposite sides with shoulders adapted for opposing the side shoulders of the retaining bumps in limited spaced relation to enable limited circumferential tolerance for reception of the bumps in the sockets but engageable under torque stresses with the sides of the bumps to hold the cover against turning so as to avoid misalignment relative to or distortion of a valve stem projecting through a valve stem aperture in the cover, said sockets being defined by radially inwardly pressed strips that clear the retaining bumps and extend from the socket shoulders to the axially outer sides of the sockets and have the sides of the strips severed from the retaining fingers to provide edges at the sides of the sockets affording said side shoulders engageable with the sides of the retaining bumps in turn-preventing relation.

7. In a cover for disposition at the outer side of a vehicle wheel, a circular cover member having an underturned marginal flange structure including a continuous annular axially inwardly extending flange having a plurality of generally axially inwardly extending circumferentially spaced cover retaining fingers of substantial arcuate dimension and tapering at their sides toward juncture with the axially extending flange between the fingers, said fingers having central portions that normally project to a substantial radially outward extent to a greater diameter than a wheel flange to which the fingers are to be engaged and with said finger sides radially inset relative to said central portions and to said axially extending flange and resiliently flexibly reactive relative thereto to enhance resilient resistance of the fingers to radially inward deflection upon engagement with a wheel flange.

8. In a cover for disposition at the outer side of a vehicle wheel, a one-piece sheet metal circular cover member having an underturned generally axially extending continuous annular flange of limited width and provided at circumferentially spaced intervals with axially inward finger extensions of substantial width and circumferentially arcuate shape having the sides thereof tapering into said continuous flange, said fingers having the longitudinally central portions thereof normally projecting to a radially outward diameter greater than the diameter of a wheel flange to be telescopically opposed by the fingers and the tapering sides of the fingers being relatively radially inset with respect to said central portions and said continuous axial flange intermediate the fingers and being resiliently flexibly reactive to control resilient tensioning of the retaining fingers upon engagement with said wheel flange.

9. In a cover for disposition at the outer side of a vehicle wheel, a one-piece sheet metal circular cover member having an underturned generally axially extending continuous annular flange of limited width and provided at circumferentially spaced intervals with axially inward finger extensions of substantial width and circumferentially arcuate shape having the sides thereof tapering into said continuous flange, said fingers having the longitudinally central portions thereof normally projecting to a radially outward diameter greater than the diameter of a wheel flange to be telescopically opposed by the fingers and the tapering sides of the fingers being relatively radially inset with respect to said central portions and being resiliently flexibly reactive to control resilient tensioning of the retaining fingers upon engagement with said wheel flange, said central portions of the fingers having retaining bump receiving sockets therein defining axially outwardly facing circumferentially straight bump-engaging shoulders and with generally radially inturned extremity portions on the fingers providing circumferentially straight ribs parallel with and adjacent to said shoulders and affording reinforcement at the axially inner sides of said sockets.

10. In a wheel structure including a tire rim having a generally radially inwardly facing annular flange, a cover for disposition at the outer side of the wheel including a circular cover member having a continuous annular marginal generally axially inwardly extending flange provided with a plurality of generally axially inwardly projecting finger extensions of substantial length merging at their sides into substantially narrower portions of the axial flange between the fingers, the fingers being engageable under radially inward flexure tension against the rim flange and resiliently reacting in the portions of the axial flange between the fingers to resiliently deflect such portions generally radially outwardly into engagement with the rim flange so that entirely about the axially extending flange there is substantially uniform gripping engagement not only by the fingers but also by the flange portions between the fingers with said rim flange.

11. In a wheel structure including a tire rim having a generally radially inwardly facing annular flange, a cover for disposition at the outer side of the wheel including a circular cover member having a continuous annular marginal generally axially inwardly extending flange provided with a plurality of generally axially inwardly projecting finger extensions of substantial length merging at their sides into substantially narrower portions of the axial flange between the fingers, the fingers being engageable under radially inward flexure tension against the rim flange and resiliently reacting in the portions of the axial flange between the fingers to resiliently deflect such portions generally radially outwardly into engagement with the rim flange so that entirely about the axially extending flange there is substantially uniform gripping engagement not only by the fingers but also by the flange portions between the fingers with said rim flange, said fingers having retaining sockets receptive of retaining bump protrusions on said rim flange and with the sockets defined at their axially inner sides by shoulders engageable latchingly with the bumps, the cover having portions thereof disposed axially and radially outwardly in line with the fingers engageable against the tire rim under draw-in by engagement of said shoulders with the bumps as aforesaid.

References Cited in the file of this patent
UNITED STATES PATENTS

| | | |
|---|---|---|
| 2,546,508 | Horn | Mar. 27, 1951 |
| 2,624,627 | Lyon | Jan. 6, 1953 |
| 2,624,628 | Lyon | Jan. 6, 1953 |
| 2,624,632 | Lyon | Jan. 6, 1953 |
| 2,624,634 | Lyon | Jan. 6, 1953 |
| 2,624,640 | Lyon | Jan. 6, 1953 |

FOREIGN PATENTS

| | | |
|---|---|---|
| 495,638 | Canada | Sept. 1, 1953 |
| 744,837 | Great Britain | Feb. 15, 1956 |